Sept. 27, 1955  E. A. YOUNG  2,719,288
CIRCUIT FAILURE DETECTING DEVICE
Filed June 11, 1953  2 Sheets-Sheet 1

LAMP SOURCE VOLTAGE

CURRENT IN WINDING 13

CHARGING CURRENT PULSES INTO
CONDENSERS 31 & 32

VOLTAGES INDUCED IN WINDING 25 WHEN
LAMP CURRENT FLOWS (FULL LINE) AND
WHEN LAMP CURRENT IS ZERO (DOTTED LINE)

EARLE A. YOUNG
INVENTOR.

BY Daniel I. Mayne

Lloyd F. Subach
ATTORNEY & AGENT

United States Patent Office 2,719,288
Patented Sept. 27, 1955

2,719,288

CIRCUIT FAILURE DETECTING DEVICE

Earle A. Young, Rochester, N. Y., assignor to Eastman Kodak Company, Rochester, N. Y., a corporation of New Jersey Application June 11, 1953, Serial No. 360,930

7 Claims. (Cl. 340—251)

This invention relates to circuit failure detecting devices and more particularly to a device for immediately detecting an open circuit amongst any one of a plurality of circuits.

It is highly desirable that the failure of certain circuit elements be immediately detected in order that the apparatus be disabled before incorrect operation can result from the defective component. Conventional approaches to the detection of defective elements in a circuit include such devices as balanced magnetic relays, thermal switches, etc., connected in the circuit with the element. Standard alternating current relays are not well suited to a wide range of operating voltage and with other types of relay systems the cost and power consumption of the detecting element is prohibitive. Thermally actuated switches are also impractical in instances where the range of currents involved vary considerably.

The invention about to be described permits detection of failure of any one of a plurality of lamps used in a photographic printer. Without suitable circuit protection, an open circuit resulting from a lamp failure or a faulty switching device in any particular lamp circuit would permit the printer to make a continuous series of improperly exposed prints until the fault was discovered after processing or until a routine check of the lamps had been made by the operator or maintenance personnel. A toroid-core type transformer associated with each of the lamps is utilized in the present invention to detect failure of any one of the printing lamps by means of three windings which are individual to different circuits. One of the windings of each transformer is in series circuit with its respective lamp so that as long as the lamp is energized, the current magnetizes and saturates the transformer core. The second winding is in series circuit with a rectifier and condenser which combination produces a current pulse in the second winding. Since the core is normally saturated by the first winding, no practical change in magnetic flux occurs by reason of the current pulse in the second winding. A control circuit including the third winding differentiates between the pulses induced in the third winding by the first and second windings, the control circuit being inoperative by the induced voltage of the first winding when lamp current is normally flowing and rendered operative only by the second winding when no lamp current is flowing for completing a circuit through a suitable tell-tale device or circuit. Such a circuit failure detecting device has been found to be very satisfactory as well as inexpensive, and since no moving parts or sensitive contacting elements are utilized, the circuit has an indefinite life and requires a minimum of maintenance.

The primary object of the invention is, therefore, to provide a circuit failure detecting device which will indicate that current flow through an element has fallen below a certain level or has failed completely.

Another object of the invention is to provide a circuit failure detecting device in which a transformer associated with the element to be detected is provided with three windings individual to separate circuits, two of the windings inducing a voltage pulse in the third winding and only one of which is phased to actuate a control circuit associated with the third winding.

Yet another object of the invention is to provide a circuit failure detecting device in which a transformer having a toroid core is associated with each of a plurality of elements to be detected and has two windings for inducing separate voltages in a third winding, the one winding being in series circuit with its respective element for maintaining the core magnetized and saturated as long as normal current flow exists in the element and the other winding inducing a voltage pulse in the third winding which is effective to render a control circuit operative only when the element circuit has failed.

And still another object of the invention is to provide a circuit failure detecting device which is inexpensive, has no contacting elements and possesses an indefinite life.

These and other objects and advantages will be apparent to those skilled in the art by the more complete description which follows.

Reference is now made to the accompanying drawings wherein like reference numerals designate like parts and wherein.

Figure 1:
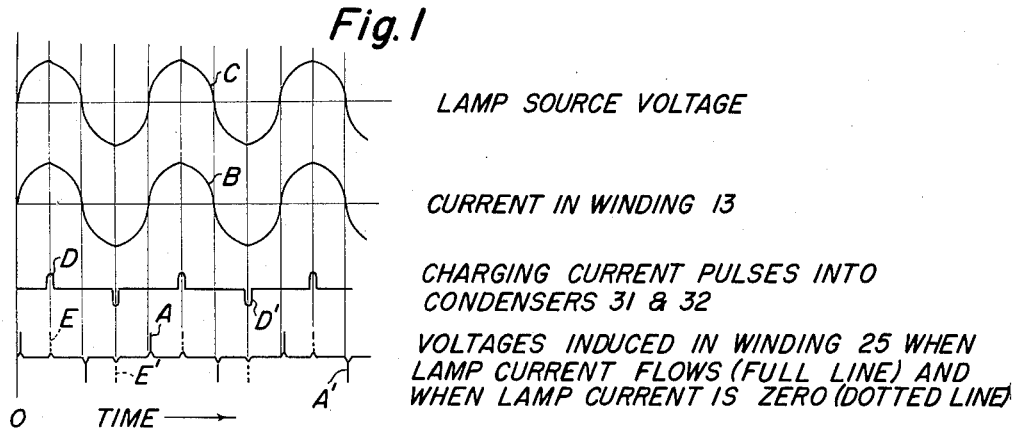
Fig. 1 is a graphical representation of the relation of the element voltage to that of the currents in and the voltages induced in the winding of the transformer core.
Figure 2:
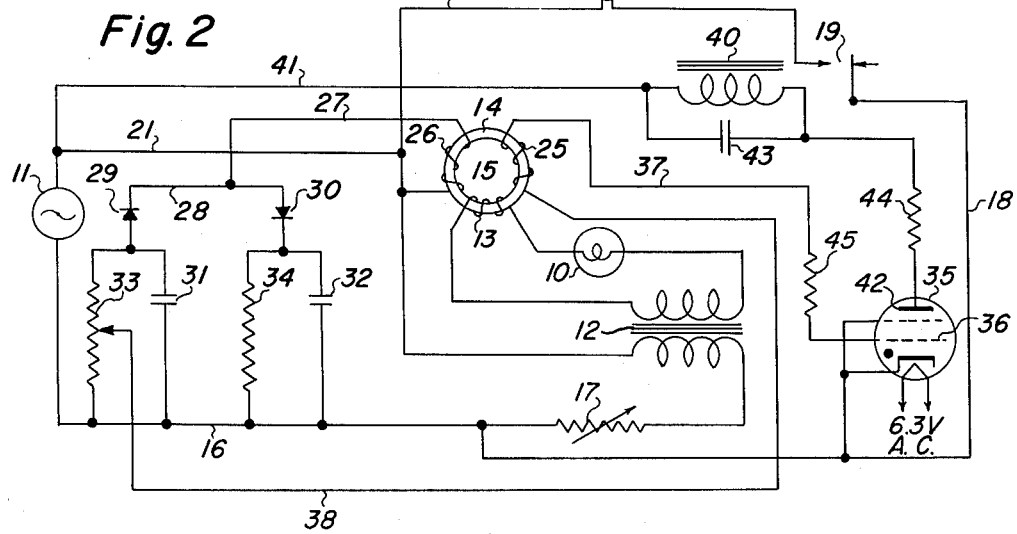
Fig. 2 is a schematic wiring diagram of the invention in which a single element is to be monitored.

The invention about to be described is readily adapted to detect failure of a lamp 10 as utilized in a photographic projection or contact printer and in Fig. 2, the circuit disclosed shows such a failure detecting circuit with relation to only a single lamp. A source 11 of essentially sinusoidal alternating current is connected through transformer 12 to a series circuit including winding 13 on toroid core 14 of transformer 15 and lamp 10 by means of line 16, adjustable resistor 17 and line 21. Contacts 19 are connected by lines 18 and 20 to lines 16 and 21, respectively, a warning device or lamp 22 being connected in line 20 for indicating failure of lamp 10 or its circuit. Core 14 of transformer 15 is of a well-known magnetic material which has the property of rather completely saturating at low magnetic flux density. With resistor 17 set at its maximum value, the number of ampere turns in winding 13 is of such number as to magnetize core 14 to saturation in either sense very soon after the direction of current flow is reversed in the circuit at the beginning of each alternation. Under such circumstances the voltages induced in winding 25 would consist of short pulses of opposite sense, as shown by full lines in Fig. 1 at A and A'. Winding 26 has one end connected to line 21 and the other end connected by line 27 to line 28 which is common to rectifiers 29 and 30 connected to line 16 through condensers 31 and 32 and resistors 33 and 34. At the peak of each alternation of the source voltage 11, rectifiers 29 and 30 alternately charge condensers 31 and 32, respectively.

With reference to Fig. 1 which shows the nature of the pulses induced in winding 25, attention is directed to the time relation of the various pulses. As long as lamp current is flowing, the core of transformer 15 is demagnetized and magnetized to saturation in the opposite sense each time the lamp current passes the region just beyond zero, as graphically shown by curve B. Since the lamp is essentially a pure resistance type load, the lamp current is in phase with the lamp source voltage, as shown by curves B and C. Under this condition of circuit operation, it is clear that the voltage pulses A and A' induced in winding 25 are timed very nearly to the points where the instantaneous value of lamp source voltage is zero. It is also to be noted that for all practical purposes no voltage pulses appear in winding 25 when the condenser charging pulses D and D' flow through winding 26. This is true because core 14 of transformer 15 is maintained so completely saturated by the lamp current flowing in winding 13 that no practical change in magnetic flux occurs when the condenser charging pulses D and D' flow in winding 26. Therefore, no practical voltage is induced in winding 25.

If lamp 10 fails, or for any reason the lamp circuit fails to energize lamp 10, no current will flow in winding 13. The reversal of magnetization in core 14 will now be controlled entirely by condenser charging pulses D and D' in winding 26 and the voltage pulses E and E', as shown in Fig. 1, induced in winding 25 will be very nearly synchronized with the condenser charging pulses D and D'. Accordingly, as long as lamp current is flowing, the circuits thus far described provide at winding 25, a series of pulses A and A' of alternate polarity and essentially timed in synchronism with the points where the lamp source voltage has just passed through the zero value. In the absence of lamp current, the pulses E and E' delivered at winding 25 are of alternate polarity but timed in synchronism with the points where the lamp source voltage is passing through its peak value.

In order to indicate failure of lamp 10 or its circuit and to differentiate between pulses EE' which result from such failure and the normal AA' pulses, a control circuit is provided which is rendered operative only by pulses E and E' induced in winding 25. Such a circuit comprises a thyratron tube 35, the control grid 36 of which is connected in series circuit with winding 25 by means of line 37 and with resistor 33 by means of line 38 to provide a suitable grid bias. A relay 40 is connected in line 41 and in series circuit with anode 42 of tube 35, condenser 43 being provided to obtain suitable filtering action for proper operation of relay 40 on current pulses from the tube and resistor 44 being inserted in line 41 to prevent high surge currents through thyratron 35 into condenser 43. Resistor 45 in line 37 is a grid circuit isolating resistor for thyratron 35.

The fixed, direct-current negative grid bias on thyratron 35 is adjusted by the slider on resistor 33 to prevent conduction during any part of the plate voltage cycle in the absence of any signal voltage induced in winding 25 of toroid transformer 15. Obviously, those voltage pulses induced in winding 25 which increase the negative grid-to-cathode voltage on the thyratron can have no practical effect. Also, as long as lamp current is flowing, those pulses from winding 25 which reduce the negative grid bias come at such time that the plate voltage of the thyratron is below the point at which conduction can be initiated, see Fig. 1. Therefore, as long as lamp current flows, there is no circuit action with respect to thyratron 35 and lamp 22 indicates such a condition. Failure of the lamp current causes the pulses from winding 25 to arrive at grid 36 when the anode voltage is at a maximum and the circuit is so phased that the charging current pulse into condenser 32 induces a voltage into winding 25 of such polarity as to reduce the negative grid bias on tube 35 when the anode voltage is near the maximum positive value with respect to the cathode. This situation causes thyratron 35 to conduct for about one-half alternation during each cycle. Under this condition relay 40 is energized and contacts 19 are closed to make the circuit through lamp 22 to indicate failure of lamp 10 or its circuit.

Figure 3:
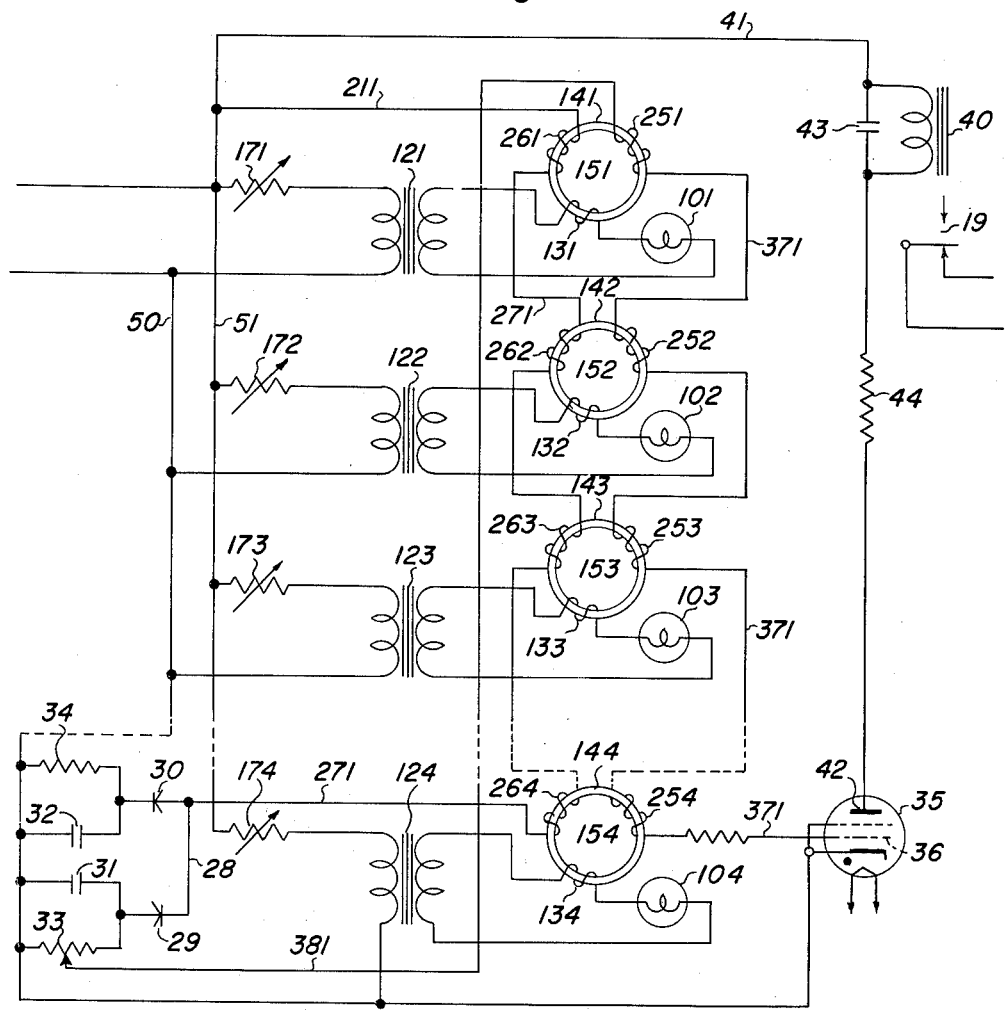
Fig. 3 is a schematic wiring diagram of the invention in which a plurality of elements are to be monitored.

In Fig. 3 a circuit is disclosed for utilizing the above described device for detecting failure in any one of a plurality of lamps or other elements, such as relays, etc. While four such lamps or elements 101–104 are disclosed, the dotted lines between the last two elements indicate that additional elements may be inserted therein. Transformers 121–124 are connected across lines 50 and 51 which are in turn, connected to a source of A. C. potential. Each of elements or lamps 101–104 has a transformer 151–154 associated therewith. The toroid cores 141–144 are provided with three windings 131–134, 251–254 and 261–264, the windings 251–254 being connected in series by line 381 to slider on resistor 33 and by line 371 to grid 36 of thyratron 35 and windings 261–264 being connected in series by line 211 to line 51 and by line 271 to common line 28 of rectifiers 29 and 30.

The functioning of the multiple circuit is essentially the same as that for the single element. Windings 131–134 normally saturate cores 141–144 as long as lamp current flows. Upon failure of any one of lamps 101–104 or its circuit, the voltage pulses induced in the associated winding 251, 252, 253, or 254 in circuit with the control grid 36 of tube 35 causes the tube to conduct, thereby energizing relay 40 and making contacts 19 which are connected to a suitable device to give warning of the failure.

While the above described circuits were devised for a specific application, it is obvious that the principle can be applied to many other circuits wherein it is required that current flow (alternating or direct) be maintained above a certain level in a single or plurality of independent circuits. It is also to be understood that certain variations can be made to achieve the same result. For example, the polarity of winding 13 of toroid transformer 15 can be reversed with improved operation in certain applications and alternating current bias can be used on thyratron 35 instead of a tap on one of the resistors associated with the condenser charging circuit. Since many other modifications and applications of the invention will be suggested and readily apparent to those skilled in the art, the scope of the invention is pointed out in the appended claims.

Having now particularly described my invention, what I desire to secure by Letters Patent of the United States and what I claim is:

1. In a device of the character described, the combination comprising an element adapted to be energized by a source of electrical potential, a transformer having a core adapted to be completely saturated at low magnetic flux density and having three windings, a first circuit including said element, the first winding on said core, and said source of electrical potential arranged in series circuit for normally energizing said element and magnetizing and saturating said core, a second circuit including the second winding on said core, means for producing a current pulse in said second winding, and a source of electrical potential arranged in series circuit for intermittently magnetizing said core, the magnetizing force being effective to induce voltages in the other windings on said core only upon failure of said first circuit, and a control circuit including the third winding on said core and responsive to the voltage induced therein by said second circuit for indicating failure of said first circuit.

2. In a device of the character described, the combination comprising an element adapted to be energized by a source of electrical potential, a transformer having a core adapted to be completely saturated at low magnetic flux density and having three windings, a first circuit including said element, the first winding on said core, and said source of electrical potential arranged in series circuit for normally energizing said element and magnetizing and saturating said core, a second circuit including the second winding on said core, means for producing a current pulse in said second winding, and a source of electrical potential arranged in series circuit for intermittently magnetizing said core, the magnetizing force being effective to induce voltages in the other windings on said core only upon failure of said first circuit, and a control circuit including the third winding on said core, an electron tube having its grid connected in series circuit with said third winding, said electron tube being rendered conductive only by the induced voltage of said second circuit for indicating failure of said first circuit.

3. In a device of the character described, the combination comprising an element adapted to be energized by a source of alternating electrical potential, a transformer having a toroid core adapted to be completely saturated at low magnetic flux density and three windings, a first circuit including said element, the first winding on said core, and said source of electrical potential arranged in series circuit for normally energizing said element and magnetizing and saturating said core in either sense at the beginning of each alternation, a second circuit including the second winding on said core, means for producing a current pulse in said second winding in phase with the peak of each alternation of the current in said first winding, and a source of electrical potential arranged in series circuit for intermittently magnetizing said core, the magnetizing force being effective to induce voltages in the other windings on said core only upon failure of said element to be energized, and a control circuit including the third winding on said core and an electron tube having its grid connected in series circuit with said third winding, said electron tube being rendered conductive only when the induced voltage of said second circuit is substantially in synchronism with the peak value of the tube source voltage for indicating failure of said first circuit.

4. In a device of the character described, the combination comprising an element adapted to be energized by a source of alternating electrical potential, a transformer having a toroid core adapted to be completely saturated at low magnetic flux density and three windings, a first circuit including said element, the first winding of said core, and said source of electrical potential arranged in series circuit for normally energizing said element and magnetizing and saturating said core in either sense at the beginning of each alternation, a second circuit including the second winding of said core, means for producing a current pulse in said second winding in phase with the peak of each alternation of the current in said first winding, and a source of electrical potential for intermittently magnetizing said core to induce a second voltage in the other windings on said core at the peak of each alternation, the induced second voltage being effective only upon failure of said element to be energized, and a control circuit including the third winding on said core, a thyratron tube having the control grid thereof connected in series circuit with said third winding, and a tell-tale device connected in the anode circuit of said tube, the voltage induced in said third winding by said first winding normally not producing conduction of said tube during any part of the anode voltage cycle and the voltage induced in said third winding by said second winding, upon failure of said element, causing said thyratron tube to conduct for completing the circuit through said tell-tale device to indicate failure of said element.

5. In a device of the character described, the combination comprising a plurality of elements adapted to be energized by a source of electrical potential, a plurality of transformers in accordance with the number of said elements, each transformer having a core adapted to be completely saturated at low magnetic flux density and having three windings, a first circuit including each of said elements and the first winding on each of said cores arranged in series circuit with said source of potential for normally energizing said elements and magnetizing and saturating said cores, a second circuit including the second winding on each of said cores, means for producing a current pulse in said second windings, and a source of electrical potential arranged in series circuit for intermittently magnetizing said cores, the magnetizing force being effective to induce voltages in the other windings on said cores only upon failure of said first circuit, and a control circuit including the third winding on each of said cores in series circuit and responsive to the voltage induced therein by said second circuit for indicating failure of said first circuit.

6. In a device of the character described, the combination comprising a plurality of elements adapted to be energized by a source of alternating electrical potential, a plurality of transformers in accordance with the number of said elements, each transformer having a toroid core adapted to be completely saturated at low magnetic flux density and three windings, a first circuit including each of said elements and the first winding on each of said cores arranged in series circuit with said source of potential for normally energizing said elements and magnetizing and saturating said cores in either sense at the beginning of each alternation, a second circuit including the second winding on each of said cores, means for producing a current pulse in said second windings in phase with the peak of each alternation of the current in said first windings, and a source of electrical potential arranged in series circuit for intermittently magnetizing said cores to induce a second voltage in the other windings on said core at the peak of each alternation, the induced second voltage being effective only upon failure of one of said elements to be energized, and a third circuit including the third winding on each of said cores in series circuit, an electron tube having its grid connected in series with said third windings, said electron tube being rendered conductive only when the induced voltage of said second circuit is substantially in synchronism with the peak value of the source voltage for indicating failure of any one of said elements.

7. In a device of the character described, the combination comprising a plurality of elements adapted to be energized by a source of alternating electrical potential, a plurality of transformers in accordance with the number of said elements, each transformer having a toroid core adapted to be completely saturated at low magnetic flux density and three windings, a first circuit including each of said elements and the first winding on each of said cores arranged in series circuit with said source of potential for normally energizing said elements and magnetizing and saturating said cores in either sense at the beginning of each alternation, a second circuit including the second winding on each of said cores, means for producing a current pulse in said second windings in phase with the peak of each alternation of the current in said first windings, and a source of electrical potential arranged in series circuit for intermittently energizing said cores to induce a second voltage in the other windings on said cores at the peak of each alternation, the induced second voltage being effective only upon failure of any one of said elements to be energized, and a third circuit including the third winding on each of said cores in series circuit, a thyratron tube having the control grid thereof connected in series circuit with said third winding, and a tell-tale device connected in the anode circuit of said tube, the voltage induced in said third windings by said first windings normally not producing conduction of said tube during any part of the anode voltage cycle and the voltage induced in said third windings by said second windings, upon failure of one of said elements, causing said thyratron tube to conduct for completing the circuit through said tell-tale device to indicate failure of any one of said elements.

References Cited in the file of this patent

UNITED STATES PATENTS

| | | |
|---|---|---|
| 1,986,112 | Logan | Jan. 1, 1935 |
| 2,324,188 | Beetem | July 13, 1943 |
| 2,405,397 | Bedford | Aug. 6, 1946 |
| 2,568,172 | Spencer | Sept. 18, 1951 |